(12) United States Patent
Muenter et al.

(10) Patent No.: US 12,195,057 B2
(45) Date of Patent: Jan. 14, 2025

(54) RAIL WHEEL SET AND CAR

(71) Applicant: LOSYCO GmbH, Bielefeld (DE)

(72) Inventors: Christoph Muenter, Vlotho-Exter (DE); Manuel Granz, Paderborn (DE)

(73) Assignee: LOSYCO GmbH, Bielefeld (DE)

( * ) Notice: Subject to any disclaimer, the term of this patent is extended or adjusted under 35 U.S.C. 154(b) by 1000 days.

(21) Appl. No.: 17/258,633

(22) PCT Filed: Jul. 2, 2019

(86) PCT No.: PCT/EP2019/067720
§ 371 (c)(1),
(2) Date: Jan. 7, 2021

(87) PCT Pub. No.: WO2020/020584
PCT Pub. Date: Jan. 30, 2020

(65) Prior Publication Data
US 2021/0269068 A1  Sep. 2, 2021

(30) Foreign Application Priority Data

Jul. 23, 2018 (DE) ..................... 20 2018 104 230.0

(51) Int. Cl.
*B61F 13/00* (2006.01)
*B60B 17/00* (2006.01)
(Continued)

(52) U.S. Cl.
CPC .......... *B61F 13/00* (2013.01); *B60B 17/0089* (2013.01); *B61F 3/08* (2013.01);
(Continued)

(58) Field of Classification Search
CPC ...... B61F 5/38; B61F 5/50; B61F 3/08; B61F 3/16; B61F 13/00; B60B 17/0089
See application file for complete search history.

(56) References Cited

U.S. PATENT DOCUMENTS 1,936,701 A   11/1933  Wilson
2,541,514 A   2/1951   Herold
(Continued)

FOREIGN PATENT DOCUMENTS

| CN | 207140683 U | 3/2018 | |
|---|---|---|---|
| DE | 2307378 A1 * | 8/1974 | ............. B61F 13/00 |

(Continued)

OTHER PUBLICATIONS

International Search Report for PCT/EP2019/067720 mailed on Oct. 17, 2019 (with English translation).
(Continued)

*Primary Examiner* — Scott A Browne
(74) *Attorney, Agent, or Firm* — Collard & Roe, P.C.

(57) ABSTRACT

A rail wheel set for a car which can be moved on a rail of a rail system has a bearing housing with a radial suspension for connecting the rail wheel set to the car, and two running wheels which are rotatably mounted on the bearing housing. Each wheel has a respective rail rolling surface, the shape of which is adapted to the contour of a running surface of the rail, and a respective ground rolling surface. The wheels can roll independently of each other on the running surface of the rail or on the ground. The rail wheel set is secured to a chassis of a car for transporting objects on a rail system.

11 Claims, 4 Drawing Sheets

Figure 1:
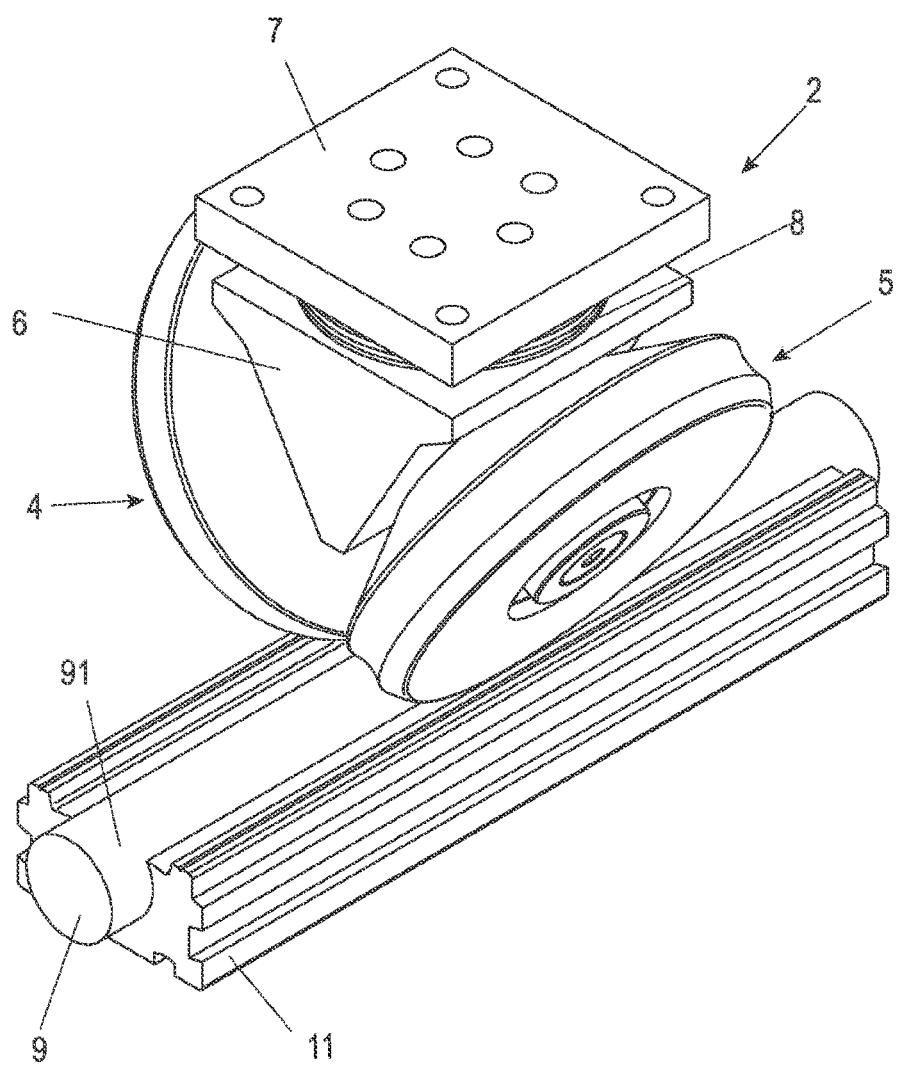

(51) Int. Cl.
*B61F 3/08* (2006.01)
*B61F 3/16* (2006.01)
*B61F 5/38* (2006.01)
*B61F 5/50* (2006.01)

(52) U.S. Cl.
CPC ............ *B61F 3/16* (2013.01); *B61F 5/38* (2013.01); *B61F 5/50* (2013.01)

(56) References Cited

U.S. PATENT DOCUMENTS

| | | | |
|---|---|---|---|
| 4,943,101 A | 7/1990 | Chapman | |
| 5,068,943 A | 12/1991 | Estkowski et al. | |
| 5,704,295 A * | 1/1998 | Lohr ................ | B62D 1/265 104/243 |
| 5,758,583 A * | 6/1998 | Lohr ................ | B62D 1/265 297/7 |
| 6,626,117 B1 * | 9/2003 | Chapman .......... | F16M 11/10 105/169 |
| 2017/0367450 A1 | 12/2017 | Karl | |

FOREIGN PATENT DOCUMENTS

| | | | |
|---|---|---|---|
| DE | 3816249 A1 | 11/1989 | |
| DE | 68908153 T2 | 11/1993 | |
| KR | 1020150030972 A | 3/2015 | |
| RU | 2574503 C2 | 2/2016 | |
| RU | 2661412 C1 | 7/2018 | |
| WO | WO-9427854 A1 * | 12/1994 | ............ B62D 1/265 |

OTHER PUBLICATIONS

Russian Office Action dated Sep. 15, 2022 (with concise explanation in English).
German Search Report in PCT/EP2019/067720 issued Apr. 19, 2023, with English translation of relevant parts.
Second Office Action of Chinese Patent Application No. 201980048532.3, Dated May 16, 2024 (with English translation).

* cited by examiner

RAIL WHEEL SET AND CAR

CROSS REFERENCE TO RELATED APPLICATIONS

This application is the National Stage of PCT/EP2019/067720 filed on Jul. 2, 2019, which claims priority under 35 U.S.C. § 119 of German Application No. 20 2018 104 230.0 filed on Jul. 23, 2018, the disclosures of which are incorporated by reference. The international application under PCT article 21(2) was not published in English.

BACKGROUND OF THE INVENTION

The present invention relates to a rail wheel set for a car movable on a rail of a rail system according to the preamble of claim 1. The invention further relates to a car.

Typical rail wheels and cars equipped with such rail wheels are usually used for the transport of heavy objects in factory buildings. In the floor of the factory building a rail system with, for example, round rails is laid on which the rail wheels can roll with low friction.

In order to be able to change the direction of travel with the cars guided on this rail system, different designs of rail wheels and rail systems are known.

It is known, for example, to attach cross-running gears to the cars, which enable a change of direction of travel in the region of an intersection laid in the rail system by raising or lowering the respective running gear, which is very costly due to the two running gears to be attached to each car and the intersections in the rail system.

Also known are rotatable wheel sets in the car in connection with rotatable rail intersections, so-called turntable switches, which have to be laid in the hall floor and must be exactly oriented at at least four points with the wheel sets arranged above them in position and axis of rotation.

This variant is also very cost-intensive with a high installation effort, in particular the rail system by providing rotatable switches. In addition, the rotatable switches tend to get dirty because they are installed in the floor of the factory hall.

It is also known to attach rotatable wheelsets to the car and to lift the car out of the rails to change the direction of travel.

The disadvantage of this variant is the height change of the car to carry out the change of the direction of travel, which is also very difficult to carry out, in particular with heavy components to be transported on the car.

It is also known that a so-called turntable is installed in the hall floor as part of the rail system. The car drives onto the turntable and is rotated together with the turntable while standing on it. It then travels off the turntable again in another direction of travel.

A further disadvantage of the cars and rail wheels known from the prior art is that the integral rail wheels in the contact region with the rail, in particular in the case of round rails with concavely formed rail rolling surfaces, rest against the rail under load in the region of a so-called pressure ellipse on both sides of a center of the wheels, which entails increased friction of the rail rolling surfaces and running surfaces of the rail wheels in particular during travel through curves.

SUMMARY OF THE INVENTION

It is the object of the present invention to provide a rail wheel set for a car movable on a rail of a rail system as well as a car with which the abovementioned disadvantages are eliminated.

This object is solved by a rail wheel set for a car movable on a rail of a rail system with the features of claim 1.

The object is further solved by a car with the features of claim 11.

The rail wheel set according to the invention has a rail rolling surface shaped to match the contour of a running surface of the rail and a bearing housing with a wheel suspension for connecting the rail wheel set to the car.

The rail wheel set also has two running wheels rotatably mounted on the bearing housing, having a respective rail rolling surface and a respective ground rolling surface, wherein the running wheels can roll independently of each other on the running surface of the rail or on a floor.

The design of a rail wheel set with two running wheels rotatably mounted on the bearing housing allows a simple and low-friction running on curved sections of a rail, since the wheel on the inside of the curve can now run slower than the wheel on the outside of the curve, depending on the section to be run.

The integral forming of both a rail rolling surface and a ground rolling surface enables the use of such a rail wheel set on a rail system in which the rail is omitted in the intersection region of two rail lines and the rail wheel set thus stands on a flat ground surface and can continue to roll on the ground rolling surfaces over this flat floor.

This allows a car or the rail wheel sets integrated in the car to be rotated about its respective vertical center axis without having to lay additional expensive rail intersections such as liftable and/or turnable switches or similar in the floor of the factory hall or to integrate appropriate lifting mechanisms in the car.

Advantageous embodiment variants of the invention are the subject matter of the subclaims.

According to an advantageous embodiment variant of the invention, the running wheels are arranged on the bearing housing at an angle to each other.

This makes it possible to improve the running behavior of the running wheels with regard to reduced differential slip.

Preferably, the running wheels are arranged on the bearing housing at an angle of 40° to 80°, in particular at an angle of 60° inclined to each other.

According to an alternative embodiment variant, the running wheels are oriented parallel to each other.

According to another embodiment variant, the rail rolling surfaces are shaped as a circular section when viewed in cross-section through a diameter of the respective wheel, which is an optimal shape in combination with a round rail.

According to another embodiment variant, a wrap angle encompassed by the two rail rolling surfaces of the running wheels is less than 180° or exactly 180° when viewed in cross-section through a diameter of the respective wheel.

This means that the running wheels can be placed on the respective rail and can be easily removed again perpendicularly to the longitudinal direction of the rail.

According to an alternative embodiment variant, this wrap angle is more than 180°, so that the rail wheel set is secured to the rail in a captive manner after attachment to the rail.

According to another preferred embodiment variant, the straight-line ground rolling surface, as viewed in cross-section through a diameter of the respective wheel, is formed on one edge of the rail rolling surfaces.

According to another advantageous embodiment variant of the rail wheel set, a plate for connection to the car is arranged on the bearing housing.

This plate is preferably mounted rotatably on the bearing housing.

The car according to the invention for transporting objects on a rail system with a chassis and rail wheel sets attached to the chassis is characterized by rail wheel sets as described above.

In the following, exemplary embodiments of the invention are explained in more detail using the enclosed drawings, wherein:

BRIEF DESCRIPTION OF THE DRAWING FIGURES

Figure 2:
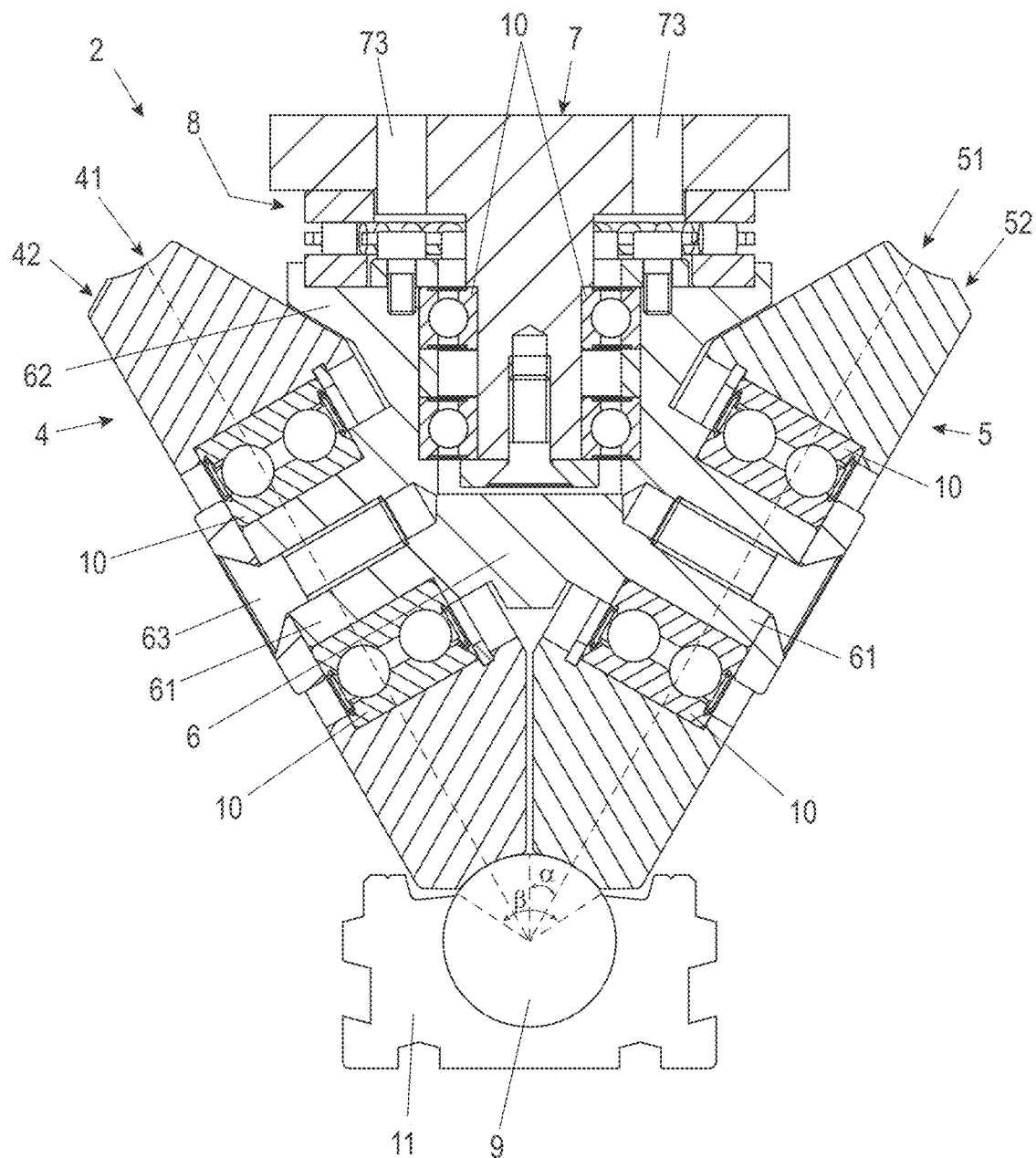
Figure 3:
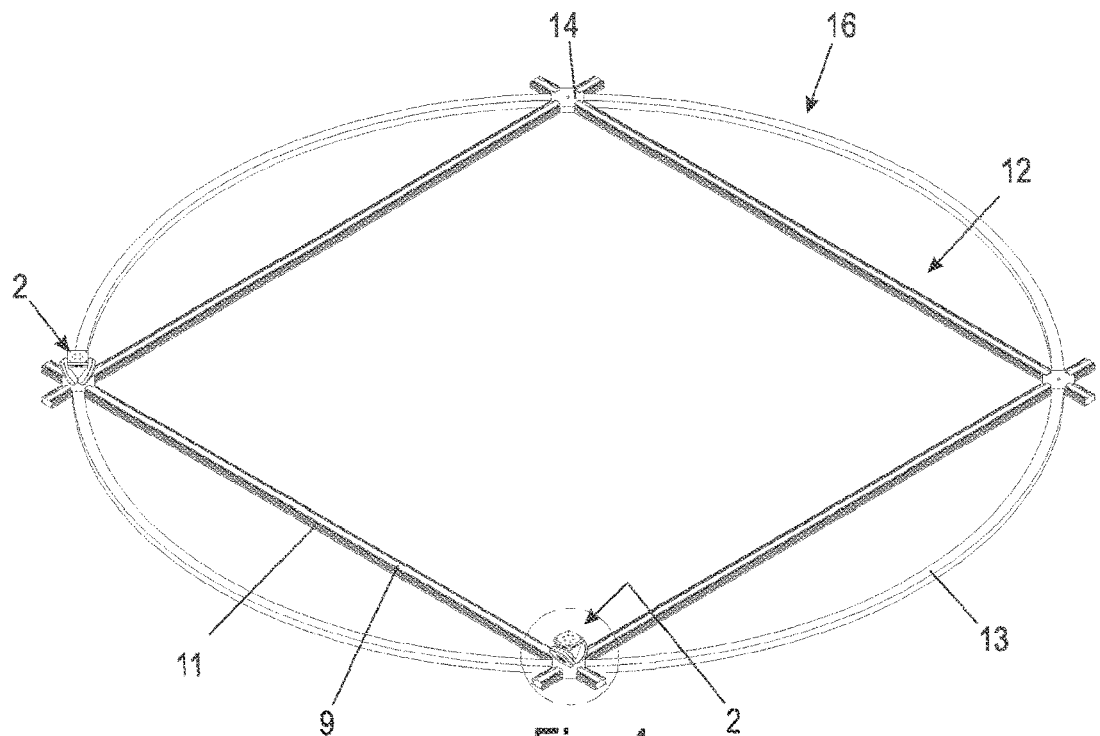
Figure 4:
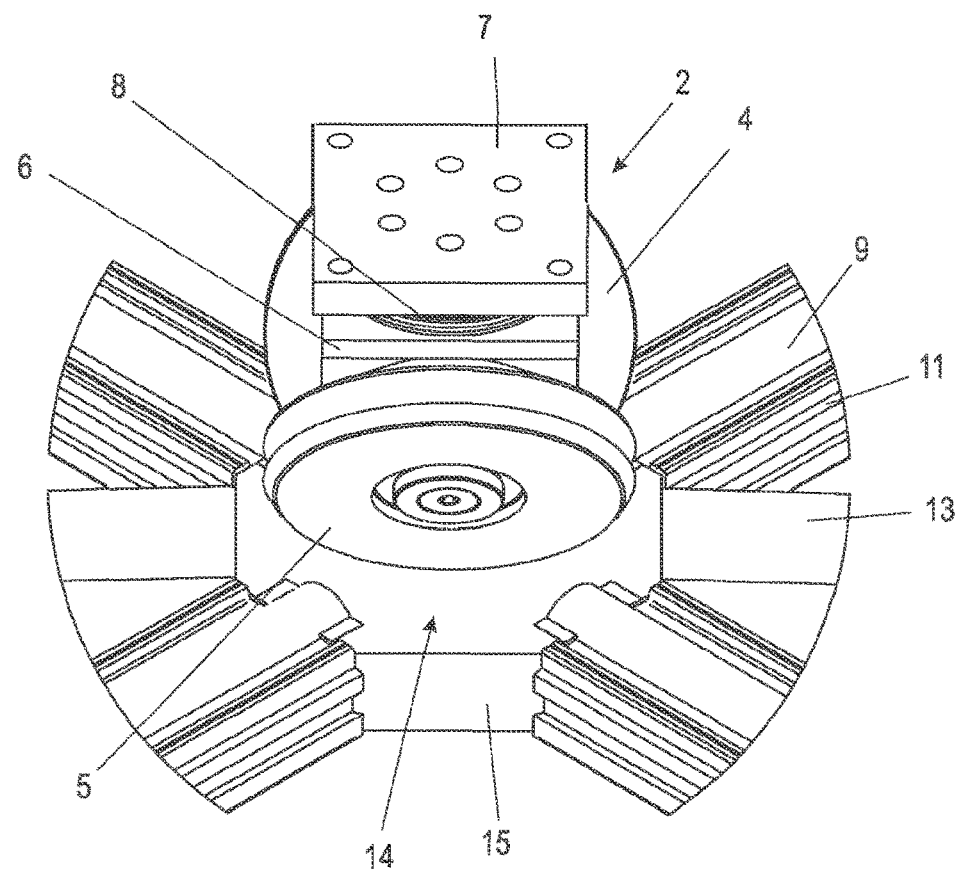
Figure 5:
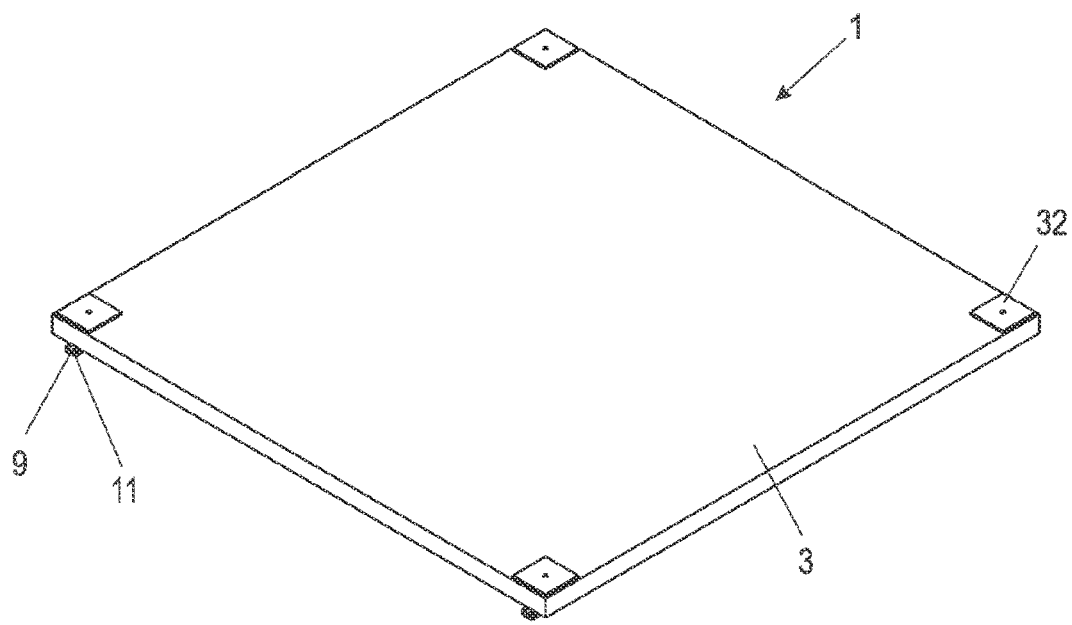
Figure 6:
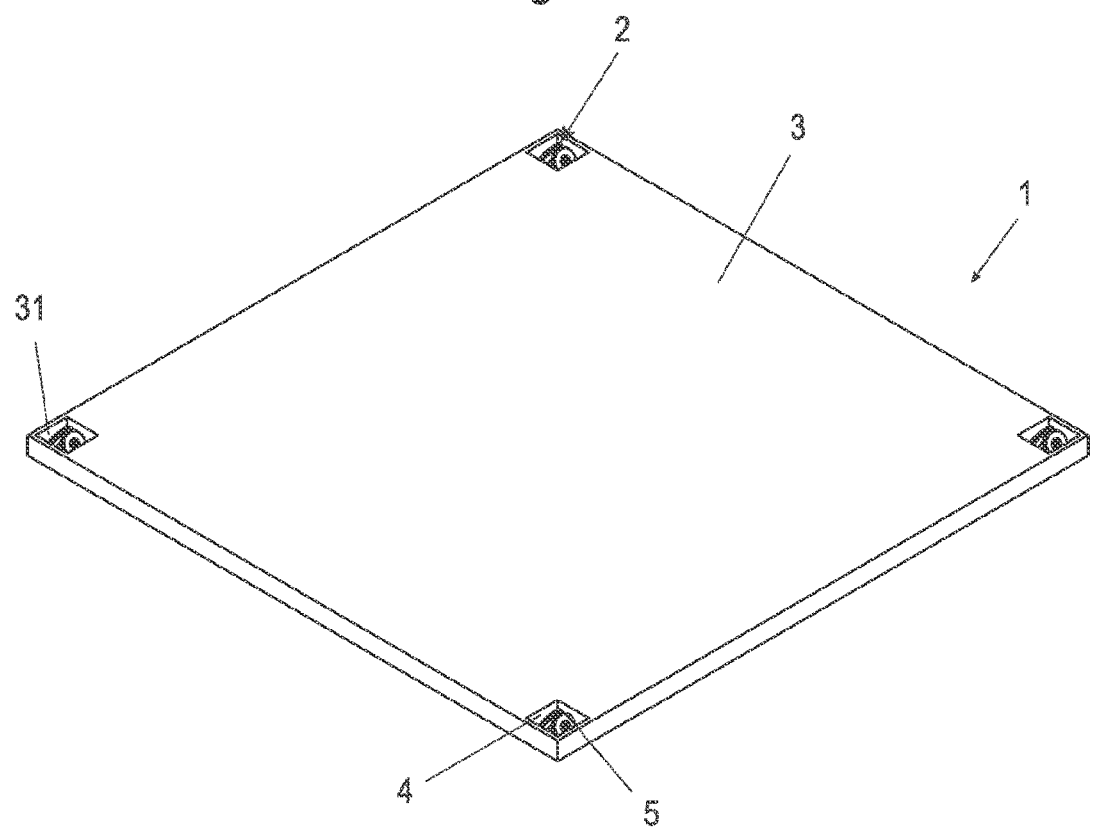

FIG. 1 shows a schematic perspective representation of an embodiment variant of a rail wheel set mounted on a rail, FIG. 2 shows a sectional view through the rail wheel set and the rail shown in FIG. 1, FIG. 3 shows a schematic perspective representation of a section of a rail system with a rotating running surface, FIG. 4 shows a perspective representation of a rail wheel set positioned at an intersection point of a rail system, FIGS. 5 and 6 show different perspective representations of a car with rail wheel sets arranged thereon.

DETAILED DESCRIPTION OF THE INVENTION

In the following figure description, terms such as above, below, left, right, front, rear, etc. refer exclusively to the exemplary representation and position of the rail wheel set, rail, car, bearing housing, running wheels and the like selected in the respective figures. These terms are not to be understood in a restrictive way, i.e. these references may change due to different working positions or the mirror-symmetrical design or the like.

In FIGS. 1-4 and 6, the reference numeral 2 designates altogether an embodiment variant of a rail wheel set for a car 1 that can be moved on a rail 9 of a rail system 12.

The rail wheel set 2 has, as shown in particular in FIGS. 1 and 2, a bearing housing 6 with two axle mounts 61 for the pivot bearing of two running wheels 4, 5.

The running wheels 4, 5, which are rotatably mounted on the bearing housing 6, each have a rail rolling surface 41, 51 and a ground rolling surface 42, 52.

The two running wheels 4, 5 can roll independently of each other on the running surface 91 of the rail 9 or on a flat floor.

The rail rolling surfaces 41, 51 of the running wheels 4, 5 are shaped to match the contour of the running surface 91 of the rail 9. In the exemplary embodiment shown in the figures, the rail 9 is designed as a round rail embedded in a rail bearing 11, which can be installed in a floor of a factory building or the like.

Accordingly, the rail rolling surfaces 41, 51 of the two running wheels 4, 5 are shaped as a circular section in cross-section through a diameter of the respective running wheel 4, 5, as shown in FIG. 2, which shows the rail wheel set 2 in such a cross-sectional view when mounted on rail 9.

In this case, the two running wheels 4, 5 are rotatably mounted via bearings, preferably roller bearings 10 on the axle mounts 61 of the bearing housing 6.

As can be seen in FIGS. 1 and 2, the running wheels 4, 5 are arranged at an angle to each other on the bearing housing 6.

Accordingly, the axle mounts 61 of the bearing housing 6 are not horizontal, but inclined.

The angle of inclination a of the running wheels 4, 5 is preferably between 20° and 40° to a vertical axis of the rail wheel set 2. The running wheels 4, 5 are oriented inclined particularly at an angle of inclination a of 30° to the vertical and are accordingly at an angle of inclination of 60° to each other.

The running wheels 4, 5 are fixed with the respective screw bolts 63 in mounting holes of the axle mounts 61.

It is also conceivable to align the running wheels 4, 5 parallel to each other.

As further shown in FIG. 2, a wrap angle β, defined by the angular distance of the outer edges of the rail rolling surfaces 41, 51, is less or exactly 180°, preferably in a range of 90° to 130°, allowing the rail wheel set 2 to be placed on the running surface 91 of the rail 9.

In principle, it is also conceivable to shape the rail rolling surfaces 41, 51 in such a way that they encompass the rail 9 at a wrap angle β of more than 180°, which would involve captive mounting of the rail wheel set 2.

The ground rolling surfaces 42, 52 of the respective running wheel 4, 5 are preferably integrally formed on one edge of the rail rolling surfaces 41, 51.

In the embodiment variant of the rail wheel set 2 running on a round rail shown here, the ground rolling surfaces 42, 52 are integrally formed on the respective outer edge of the rail rolling surfaces 41, 51.

The ground rolling surfaces 42, 52 are straight or slightly convex in cross-section through a diameter of the respective running wheel 4, 5, as shown in FIG. 2, to ensure a sufficient contact surface on a flat floor.

To fix the rail wheel set 2 to a car 1, as shown in FIGS. 5 and 6 by way of example, the bearing housing 6 has a plate bearing holder 62 to accommodate a plate 7, which can be fixed, in particular screwed, to a chassis 3 of car 1.

In this case, several holes 73 are provided in the plate 7 for the screw connection of plate 7. These holes 73 are used for the passage of screw bolts and can be used to screw the plate 7 to the chassis 3, for example to mounting plates 32 of the chassis 3.

As shown in FIG. 2, the plate 7 is attached to the bearing housing 6, preferably rotatably via a pivot bearing 8. The plate 7 is preferably mounted via roller bearings 10 both around a vertical axis of rotation in the plate bearing holder 62 and via a horizontally oriented pivot bearing on the bearing housing 6.

FIG. 3 shows a section of a rail system 12, with rails 9 running at the same angle to each other and meeting at the respective intersection points 14.

In the region of these intersection points 14 there is no rail but a flat plate 15.

From this intersection point 14 with the centrally arranged flat plate 15, both rails 9 and a rotating track 13 with a flat running surface extend.

The rotating track 13 and the distances between the intersection points 14 are adapted to the dimensions of the positions of the rail wheel sets 2 on car 1.

In the embodiment variant shown here in FIGS. 3, 5 and 6, the rail wheel sets 2 are arranged relative to each other as a square, so that a turnstile shown in FIG. 3 as an example requires only four such intersection points 14.

A rectangular arrangement of the rail wheel sets 2 on car 1 is also conceivable, for example, for which four or more intersection points 14 would have to be provided in a turnstile shown in FIG. 3.

In order to turn the car 1, the rail wheel sets 2 must be pushed down from rail 9 onto the flat plate 15 as shown in FIG. 4 as an example.

On this flat plate 15, the ground rolling surfaces 42, 52 now rest on the surface of the plates 15 and can be easily rotated around a vertical central axis of the respective rail wheel set 2 to perform the rotary movement, so that the alignment of the rail wheel set 2 faces in the direction of the rotating track 13 or the transversely extending rail 9. During this rotation of the respective rail wheel sets 2, the running wheels 4, 5 rotate in opposite directions.

Then the car 1 can be moved on the turnstile 16 in a rotary motion so that the rail wheel sets 2 are moved from a first intersection point 14 to an adjacent second intersection point 14 along the rotating tracks 13.

As an alternative to turning the car, it can be moved further by moving the wheelsets 2 transversely at the respective intersection point 14 on the transversely extending rail 9.

After reaching the next intersection point 14, the rail wheelsets 2 are rotated again about their vertical axis until they are oriented parallel to a rail 9, so that the car 1 can then be moved along an imaginary extension of parallel extending rails 9 in a direction different from the initial direction.

In addition to the arrangement of the plates 7 on the bearing housing 6 centrically to the running wheels 4, 5, which is shown as a preferred exemplary embodiment, it is also conceivable that the axis of rotation of the plate 7 is eccentrically positioned on the bearing housing 6.

Another advantage of the angularly oriented running wheels 4, 5 compared to an integral running wheel placed on the rail is the reduced friction between the running wheels and the rail. As a result of the large forces that regularly occur in the use of such cars 1 when transporting heavy objects, a pressure ellipse is always formed when rolling running wheels with a concave rail rolling surface, which is accompanied by an offset of the rolling radius within the rail rolling surface.

As the force is applied in the vertical direction (direction of the weight force) in an integrally designed running wheel, there is a greater offset of the rolling radius than in a rail wheel set with two running wheels, in particular running wheels 4, 5, which are oriented at an angle to each other, as shown by way of example in FIG. 2, as the force is applied at an angle to the vertical of the rail 9.

With a pressure ellipse forming symmetrically to the point of force application, the resulting offset of the rolling radius in relation to a rail wheel with a running wheel placed vertically on the rail is significantly reduced.

A further advantage of the inclined running wheels 4, 5 is that, compared to a vertical running wheel arrangement, larger rolling diameters are possible with the same overall height of the rail wheel set or a flatter, more compact overall height is possible with the same rolling diameter of the running wheels, compared to running wheels standing vertically on a round rail.

LIST OF REFERENCE NUMERALS

1 Car
2 Rail wheel set
3 Chassis
31 Wheel mount
4 Running wheel
41 Rail rolling surface
42 Ground rolling surface
Running wheel
51 Rail rolling surface
52 Ground rolling surface
6 Bearing housing
61 Axle mount
62 Plate bearing holder
63 Screw bolt
7 Plate
71 Upper side
72 Underside
73 Hole
8 Pivot bearing
9 Rail
91 Running surface
Roller bearing
11 Rail bearing
12 Rail system
13 Rotating track
14 Intersection region
Plate
16 Turnstile
α Angle of inclination
β Wrap angle

What is claimed is:

1. A rail wheel set (2) for a car (1) movable on a rail (9) of a rail system (12), comprising a bearing housing (6) having a wheel suspension configured for connecting the rail wheel set (2) to the car (1), and two running wheels (4, 5) rotatably mounted on the bearing housing (6), each of the wheels having a respective rail rolling surface (41, 51) shaped to match a contour of a running surface of the rail (9), and a respective ground rolling surface (42, 52), wherein the wheels are configured to roll independently of one another on the running surface (91) of the rail (9) or on a floor, wherein the rail rolling surfaces each have an inner edge and an outer edge, wherein the ground rolling surfaces (42, 52) are each integrally formed in one piece with the outer edge of the respective rail rolling surfaces (41, 51), and wherein the rail rolling surfaces configured to be arranged on the rail together with the inner edges of the rail rolling surfaces facing each other, with the ground rolling surfaces to the outside.

2. The rail wheel set (2) according to claim 1, wherein the running wheels (4, 5) are arranged on the bearing housing (6) oriented inclined at an angle to one another.

3. The rail wheelset (2) according to claim 2, wherein the running wheels (4, 5) are each oriented inclined to one another at an angle of inclination (a) of 40° to 80°.

4. The rail wheel set (2) according to claim 1, wherein the running wheels (4, 5) are oriented parallel to one another.

5. The rail wheel set (2) according to claim 1, wherein the rail rolling surfaces (41, 51) are formed as a circular section in cross-section through a diameter of the respective running wheel (4, 5).

6. The rail wheel set (2) according to claim 1, wherein a wrap angle (B) encompassed by the two rail rolling surfaces (41, 51) of the running wheels (4, 5) is less than 180° or exactly 180° when viewed in cross-section through a diameter of the respective running wheel (4, 5).

7. The rail wheel set (2) according claim 1, wherein a wrap angle (B) encompassed by the two rail rolling surfaces (41, 51) of the running wheels (4, 5) is more than 180° when viewed in cross-section through a diameter of the respective running wheel (4, 5).

8. The rail wheel set (2) according to claim 1, wherein the ground rolling surfaces (42, 52), as viewed in cross-section through a diameter of the respective running wheel (4, 5), are straight.

9. The rail wheel set (2) according to claim 1, wherein a plate (7) configured for connection to the car (1) is arranged on the bearing housing (6).

10. The rail wheel set (2) according to claim 9, wherein the plate (7) is rotatably attached to the bearing housing (6).

11. A car (1) for transporting objects on a rail system (12), comprising a chassis (3) and rail wheel sets (2) attached to the chassis (3), wherein the rail wheel sets (2) are designed according to claim 1.

\* \* \* \* \*